(12) United States Patent
Cunha et al.

(10) Patent No.: US 7,513,040 B2
(45) Date of Patent: Apr. 7, 2009

(54) MANUFACTURABLE AND INSPECTABLE COOLING MICROCIRCUITS FOR BLADE-OUTER-AIR-SEALS

(75) Inventors: Frank Cunha, Avon, CT (US); Om Parkash Sharma, South Windsor, CT (US); Edward F. Pietraszkiewicz, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 507 days.

(21) Appl. No.: 11/217,702

(22) Filed: Aug. 31, 2005

(65) Prior Publication Data

US 2007/0048128 A1 Mar. 1, 2007

(51) Int. Cl.
*B23P 15/00* (2006.01)
*F01D 25/12* (2006.01)
*F01D 9/04* (2006.01)

(52) U.S. Cl. .................. 29/889.2; 29/527.5; 415/173.1; 164/516

(58) Field of Classification Search ................ 415/115, 415/116, 173.1; 164/516, 517, 518, 519; 29/527.5, 889.2, 889.21, 889.22
See application file for complete search history.

(56) References Cited

U.S. PATENT DOCUMENTS

| 4,573,866 | A | * | 3/1986 | Sandy et al. | 415/116 |
| 4,679,981 | A | * | 7/1987 | Guibert et al. | 415/116 |
| 5,392,515 | A | | 2/1995 | Auxier et al. | |
| 6,331,217 | B1 | * | 12/2001 | Burke et al. | 148/522 |
| 6,402,464 | B1 | * | 6/2002 | Chiu et al. | 415/116 |
| 6,638,639 | B1 | * | 10/2003 | Burke et al. | 428/583 |
| 6,779,597 | B2 | * | 8/2004 | DeMarche et al. | 165/169 |
| 7,306,424 | B2 | * | 12/2007 | Romanov et al. | 415/115 |
| 2004/0047725 | A1 | * | 3/2004 | Tomita et al. | 415/116 |

OTHER PUBLICATIONS

Materials Development Corporation, Ni-Flex nickel based braze alloys in ductile foil and wire, Aug. 26, 2004 <http://materialsdevelopment.com/foils_brazes.htm>.*

* cited by examiner

*Primary Examiner*—Edward Look
*Assistant Examiner*—Nathaniel Wiehe
(74) *Attorney, Agent, or Firm*—Bachman & LaPointe, P.C.

(57) ABSTRACT

A method for manufacturing a cooling microcircuit in a blade-outer-air-seal is provided. The method broadly comprises the steps of forming a first section of the blade-outer-air-seal having a first exposed internal wall, forming a second section of the blade-outer-air-seal having a second exposed internal wall, and forming at least one cooling microcircuit on at least one of the first and second exposed internal walls.

10 Claims, 2 Drawing Sheets

MANUFACTURABLE AND INSPECTABLE COOLING MICROCIRCUITS FOR BLADE-OUTER-AIR-SEALS

BACKGROUND OF THE INVENTION (1) Field of the Invention

The present invention relates to a method for fabricating a blade-outer-air-seal (BOAS) and to a BOAS manufactured thereby.

(2) Prior Art

As of today, the enabling technology for cooling microcircuits relies upon, and is implemented by, refractory metal cores in a double wall design. The refractory metal cores have an elevated melting temperature, making it desirable for processing during investment casting before being leached out and forming the intricate microcircuit passageways within the blade wall (hence the term double wall design).

One of the difficulties in forming cooling microcircuits in this fashion is the lack of an easy way to access the microcircuits for inspection.

SUMMARY OF THE INVENTION

Accordingly, it is an aim of the present invention to provide a method for manufacturing cooling microcircuits in BOAS which lends itself towards facilitating inspection of the microcircuits that are formed.

In accordance with the present invention, a method for manufacturing cooling microcircuits in BOAS is provided. The method broadly comprises the steps of forming a first section of the blade-outer-air-seal having a first exposed internal wall, forming a second section of the blade-outer-air-seal having a second exposed internal wall, and forming at least one cooling microcircuit on at least one of the first and second exposed internal walls.

Further, in accordance with the present invention, a blade-outer-air-seal is provided. The blade-outer-air-seal broadly comprises a cast first section, a cast second section, at least one cooling microcircuit intermediate the first and second sections, and a mating surface interlayer between the first and second sections.

Other details of the manufacturable and inspectable cooling microcircuits for blade-outer-air-seals, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
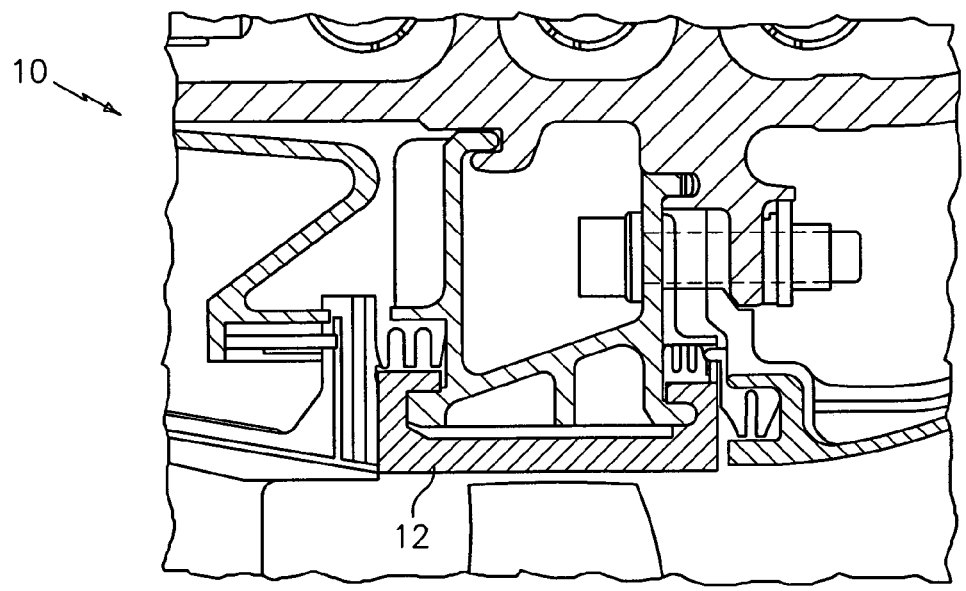
FIG. 1 is a cross sectional view showing the location of a blade-outer-air-seal.

Referring now to the drawings, FIG. 1 illustrates a portion of a gas turbine engine 10 showing the location of a blade-outer-air-seal 12.

Figure 2:
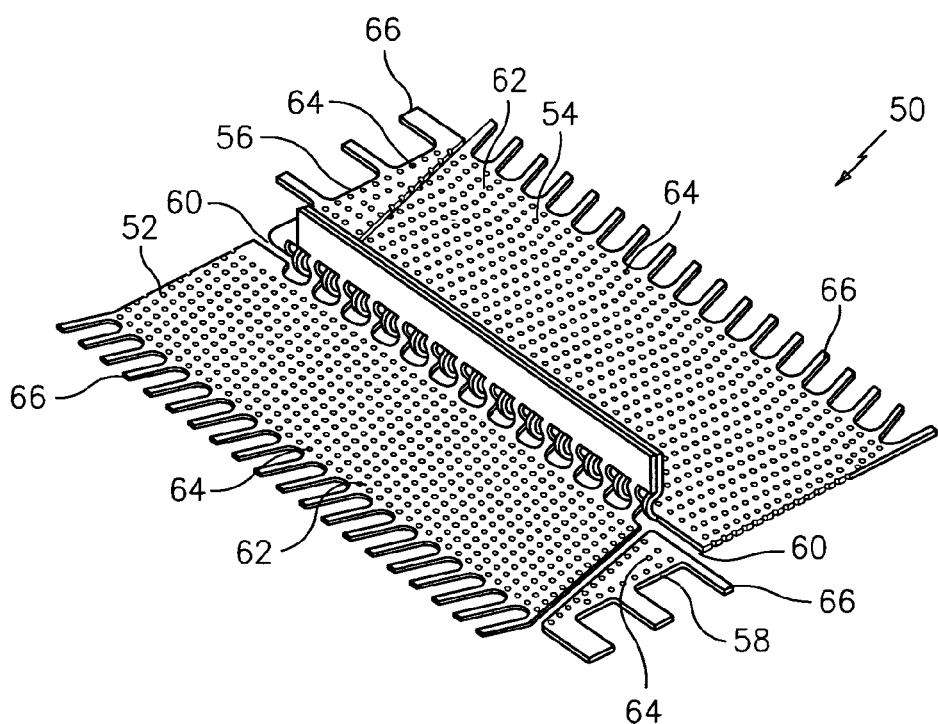
FIG. 2 illustrates a microcircuit core for cooling passageways.

FIG. 2 illustrates a typical cooling microcircuit 50 which may be used in the blade-outer-air seal 12. It should be recognized that this microcircuit is merely exemplary and other types of microcircuits can be used in the blade-outer-air-seal 12. The microcircuit 50 has a leading edge microcircuit 52, a trailing edge microcircuit 54, and side microcircuits 56 and 58. Each of the microcircuits 52 has one or more cooling fluid inlets 60, a plurality of passageways 62 formed by a plurality of internal features 64, and a plurality of fluid outlets 66. The internal features 64 may have any desired shape. For example, the internal features 64 could be cylindrically shaped pedestals or oval shaped pedestals. Different shaped internal features 64 could be used to form the cooling passageways 62 for optimum cooling in a particular microcircuit.

Figure 3:
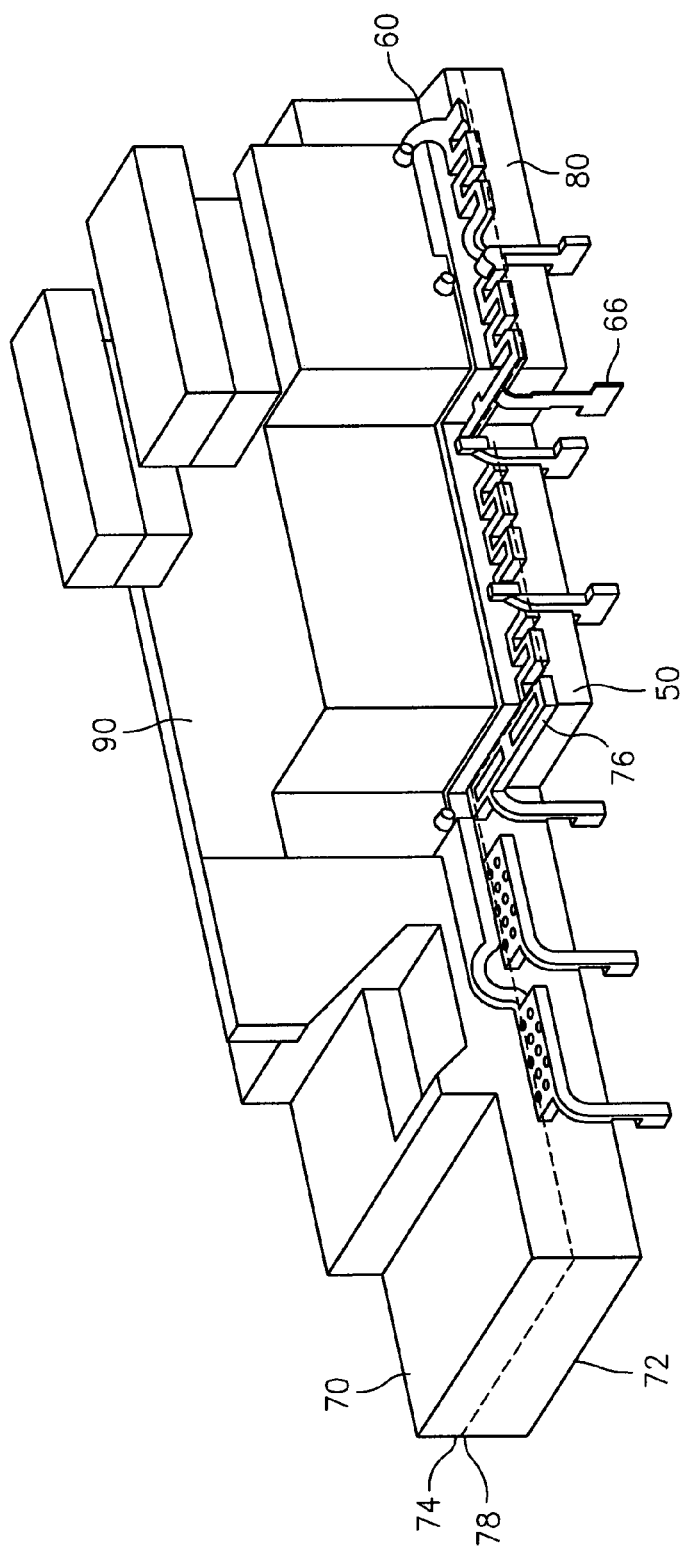
FIG. 3 illustrates a microcircuit manufacturing method with a split line construction in accordance with the present invention.

FIG. 3 illustrates the manner in which the cooling microcircuit 50 is formed in a blade-outer-air-seal 12 in accordance with the present invention. First, the blade-outer-air-seal 12 is formed by two sections 70 and 72. The sections 70 and 72 may be formed from any suitable material, such as a nickel-based alloy, a cobalt-based alloy, an iron-based alloy, or a titanium-based alloy, and are preferably cast, using any suitable technique known in the art, in a manner that exposes the respective internal walls 74 and 76. As can be seen from FIG. 3, the two sections 70 and 72 may be separated along a split line 78. The split line 78 may be formed so that it passes through the middle of the microcircuit 50. In this case, a portion of the microcircuit 50 may be formed on each of the internal walls 74 and 76. In a preferred embodiment, the split line 78 passes just above the microcircuit 50. The location of the split line 78 is determined by the stresses that would act across bonding surfaces. Preferably, the split line 78 is placed where such stresses are minimized.

The internal features 64 of the microcircuit 50 may be formed on one or both of the internal walls 74 and 76 using any suitable technique known in the art. For example, the internal features 64 may be manufactured from metal matrix composites using plasma spraying thickness build-up with pre-alloyed powder followed by surface finish control. Alternatively, the internal features 64 may be manufactured by a combination of hot-working, surface grinding, and chemical milling to final thickness. The fact that the internal walls 74 and 78 are totally exposed permits a search of an optimum cooling arrangement in terms of durability and manufacturing. This also allows the microcircuit 50 to be implemented in a single wall product.

When the microcircuit is formed only one of the walls 74 and 76, a cover plate 80 is placed over the microcircuit. The cover plate 80 may be formed from the same material as the blade-outer-air-seal or the same material as the internal features 64, or any other suitable material known in the art. The cover plate 80 may be bonded in place using any suitable bonding technique known in the art. Preferably, a solid state diffusion bonding process may be used to join the cover plate 80 to the internal features 64.

Figure 4:
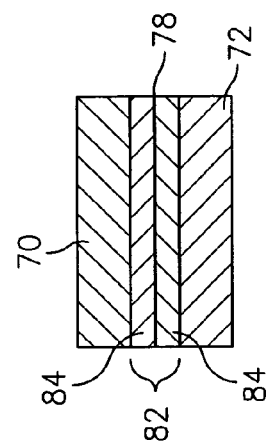
FIG. 4 illustrates a transient liquid phase bonding technique for joining sections of the blade-outer-air-seal together.

Referring now to FIG. 4, in a final step, the blade-outer-air-seal 10 is assembled along the split line 78 by joining the sections 70 and 72 together using any suitable bonding process known in the art. In a preferred embodiment, the bonding process used to join the sections 70 and 72 together is a transient liquid phase bonding process in which a mating surface interlayer 82 is created using foils 84 that deposit a thin film of an interlayer of an alloying metal with a composition close to that of the parent metal along with a melting point depressant. This thin interlayer 82 with the parent blade pieces are bonded and heated simultaneously causing a liquid interlayer. While at temperature, rapid diffusion occurs. The resulting change in interlayer composition causes isothermal solidification of the bond while at temperature. Post bond heat treatment allows for further additional diffusion resulting in a joint ideally equivalent, both microstructurally and chemically, to the parent base metal. The re-melt temperature of the bond line is comparable to the melting point of the base blade material. Effectively, the bond region mechanical properties approach those of the base blade material. Since the resulting properties are reduced at the split line 78, its location is placed where the operating stresses are minimized. As previously mentioned, the BOAS segmentation is preferably placed on a region where the stresses across the bonding surfaces are also minimized.

As shown in FIG. 3, there is a ceramic core 90 which is present during the casting of the sections 70 and 72. The ceramic core may be removed, preferably by a chemical technique, after the sections 70 and 72 have been joined.

While only one split line 78 has been illustrated, if desired, the BOAS sections can be separated by a plurality of split lines.

One of the principal advantages of the method of the present invention is the ease of manufacture of the BOAS and its internal cooling microcircuits. Another principal advantage is the ability to manufacture and inspect the internal cooling microcircuits prior to assembling the BOAS.

It is apparent that there has been provided in accordance with the present invention, a manufacturable and inspectable cooling microcircuit for a blade-outer-air-seal which fully satisfies the objects, means, and advantages set out hereinbefore. While the present invention has been described in the context of specific embodiments thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. A method for manufacturing a cooling microcircuit in a blade-outer-air-seal comprising the step of:
    forming a first section of the blade-outer-air-seal having a first exposed internal wall;
    forming a second section of the blade-outer-air-seal having a second exposed internal wall;
    forming at least one cooling microcircuit on at least one of the first and second exposed internal walls; and
    said at least one cooling microcircuit forming step comprising forming internal features of said at least one cooling microcircuit from metal matrix composites using plasma spraying thickness with pre-alloy power followed by surface finish control.

2. The method according to claim 1, further comprising forming the first second and second section by casting.

3. The method of claim 1, further comprising forming at least one cooling microcircuit on each of the first and second exposed internal walls.

4. The method of claim 1, further comprising placing a cover over said at least one cooling microcircuit and bonding said cover to the internal features of said at least one cooling microcircuit.

5. The method of claim 4, wherein said cover bonding step comprises bonding said cover to said internal features using a solid state diffusion bonding process.

6. The method of claim 1, further comprising joining said first section to said second section after formation of said at least one cooling microcircuit.

7. The method of claim 6, wherein said joining step comprises joining said first section to said second section along at least one split line using a transient liquid phase bonding technique.

8. The method of claim 7, further comprising subjecting said blade-outer-air-seal to a post bond heat treatment for causing additional diffusion.

9. The method of claim 1, wherein said at least one microcircuit forming step comprises forming a microcircuit having a leading edge cooling microcircuit and a trailing edge cooling microcircuit.

10. The method of claim 9, wherein said at least one microcircuit forming step further comprises forming at least one side edge cooling microcircuit which is independent of said leading edge cooling microcircuit and said trailing edge cooling microcircuit.

* * * * *

UNITED STATES PATENT AND TRADEMARK OFFICE
CERTIFICATE OF CORRECTION

PATENT NO.        : 7,513,040 B2
APPLICATION NO. : 11/217702
DATED             : April 7, 2009
INVENTOR(S)       : Frank Cunha et al.

Page 1 of 1

It is certified that error appears in the above-identified patent and that said Letters Patent is hereby corrected as shown below:

In column 4, claim 1, line 8, "power" should read --powder--.

In column 4, claim 2, line 11, after "first", the word "second" should read --section--.

Signed and Sealed this

Twenty-fifth Day of August, 2009

David J. Kappos
*Director of the United States Patent and Trademark Office*